(12) United States Patent
Kaul

(10) Patent No.: US 11,429,415 B2
(45) Date of Patent: Aug. 30, 2022

(54) DYNAMIC TUNING OF HYPERVISOR FOR HIGH-PERFORMANCE VIRTUAL MACHINES

(71) Applicant: Red Hat Israel, Ltd., Ra'anana (IL)

(72) Inventor: Yaniv Kaul, Raanana (IL)

(73) Assignee: Red Hat Israel, Ltd., Ra'anana (IL)

( * ) Notice: Subject to any disclaimer, the term of this patent is extended or adjusted under 35 U.S.C. 154(b) by 121 days.

(21) Appl. No.: 16/366,771

(22) Filed: Mar. 27, 2019

(65) Prior Publication Data

US 2020/0310848 A1 Oct. 1, 2020

(51) Int. Cl.
*G06F 9/455* (2018.01)
*G06F 1/3234* (2019.01)

(52) U.S. Cl.
CPC ........ *G06F 9/45558* (2013.01); *G06F 1/3234* (2013.01); *G06F 2009/4557* (2013.01); *G06F 2009/45595* (2013.01)

(58) Field of Classification Search
CPC .............. G06F 9/45558; G06F 1/3234; G06F 2009/4557; G06F 2009/45595
See application file for complete search history.

(56) References Cited

U.S. PATENT DOCUMENTS

| | | | |
|---|---|---|---|
| 7,739,532 B2 * | 6/2010 | Grobman | G06F 1/3296 718/1 |
| 8,106,485 B2 | 4/2012 | Krishnakumar et al. | |
| 9,641,385 B1 | 5/2017 | Daniel et al. | |
| 9,921,864 B2 | 3/2018 | Singaravelu et al. | |
| 9,990,393 B2 | 6/2018 | Burdick et al. | |
| 10,061,621 B1 * | 8/2018 | Chen, II | G06F 9/5072 |
| 2005/0268078 A1 * | 12/2005 | Zimmer | G06F 9/45533 713/1 |
| 2011/0296234 A1 * | 12/2011 | Oshins | G06F 9/45558 714/5.11 |
| 2014/0137107 A1 * | 5/2014 | Banerjee | G06F 1/3234 718/1 |
| 2014/0337837 A1 * | 11/2014 | Padala | G06F 9/5072 718/1 |
| 2015/0142524 A1 * | 5/2015 | Jung | G06Q 30/0206 705/7.35 |
| 2015/0263983 A1 * | 9/2015 | Brennan | H04L 41/12 709/226 |
| 2017/0060720 A1 * | 3/2017 | Ramanath | G06F 11/3495 |

(Continued)

OTHER PUBLICATIONS

"SKVM Internals: Tuning your Virtual I/O Performance", IBM, located at https://www.mikelangelo-project.eu/2016/07/skvm-internals-tuning-your-virtual-io-performance/, Jun. 27, 2016, 7 pages.

(Continued)

*Primary Examiner* — Emerson C Puente
*Assistant Examiner* — Jonathan R Labud
(74) *Attorney, Agent, or Firm* — Womble Bond Dickinson (US) LLP

(57) ABSTRACT

A method of dynamically tuning a hypervisor includes detecting that a high-performance virtual machine was launched on the hypervisor. The method further includes, in response to the detecting, modifying, by a processing device, a configuration of the hypervisor to increase performance of the high-performance virtual machine on the hypervisor.

16 Claims, 4 Drawing Sheets

(56) References Cited

U.S. PATENT DOCUMENTS

2018/0239648 A1\* 8/2018 Formanek ........... G06F 9/45558
2019/0095231 A1\* 3/2019 Patel .................... G06F 9/5077

OTHER PUBLICATIONS

Bigelow, "How Hypervisors Dynamically Allocate Memory to Improve VM Performance", located at https://searchservervirtualization.techtarget.com/feature/How-hypervisors-dynamically-allocate-memory-to-improve-VM-performance, Jun. 2013, 3 pages.
Lee, "Performance Tuning Microsoft Windows Server Hyper-V", https://www.vembu.com/blog/performance-tuning-microsoft-windows-server-hyper-v/, Jun. 15, 2018, 12 pages.

\* cited by examiner

DYNAMIC TUNING OF HYPERVISOR FOR HIGH-PERFORMANCE VIRTUAL MACHINES

TECHNICAL FIELD

Aspects of the present disclosure relate to dynamic tuning of hypervisors for high-performance virtual machines.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc.

Virtual machines running on hypervisors have a variety of workloads with distinct requirements. Some workloads require more performance than others. Some workloads (e.g., SAP workloads) require strict performance requirements and/or thresholds to be certified. Other workloads (e.g., VIOP) are latency sensitive. Other, less intensive workloads, allow for better power savings on the host. Various configurations of the hypervisor and virtual machines affect the performance and power consumption of virtual machines running workloads.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Described herein are methods and systems for dynamic tuning of hypervisor for high-performance virtual machines. In a virtualized environment, hypervisors are computer software, hardware, and/or firmware that creates or runs virtual machines. A computer on which a hypervisor runs may be a host machine, while each virtual machine run by the hypervisor may be a guest machine.

Currently, hypervisors may be configured such that a processing device (e.g., CPU) of the hypervisor enters a low-power mode (e.g., sleep, enter a suspended state, etc.) periodically to save processing power. In some cases, hypervisors in low-power modes may increase latency for some workloads running on the underlying virtual machines. Such increased latency may be undesirable and even impermissible for some workloads.

In one embodiment, the above latency problem may be mitigated by disabling the low-power mode on the hypervisor. Such a solution may have drawbacks, however, not the least of which includes an increased power usage on the host machine. This increased power usage may be problematic when the latency introduced by a low-power mode may be acceptable to the virtual machines running on the host machine.

Aspects of the disclosure address the above and other deficiencies by providing for systems and methods that allow for dynamic tuning of hypervisor for high-performance virtual machines. In one embodiment, processing logic described herein detects that a high-performance virtual machine was launched on a hypervisor. In one embodiment, a high-performance virtual machine is a virtual machine that processes one or more resource-intensive workloads. In response to detecting that the high-performance virtual machine was launched (is currently running) on the hypervisor, processing logic modifies a configuration of the hypervisor to increase performance of the high-performance virtual machine on the hypervisor.

For example, processing logic may modify the configuration of the hypervisor to instruct a processing device on the host running the hypervisor to not enter a low-power state. In one embodiment, so long as a single high-performance virtual machine is running on the host, the processing device may not enter a low-power state. If it is determined that no high-performance virtual machines are currently active (e.g., running, instantiated, etc.) on the host machine, processing logic may instruct the processing device to re-enable low-power mode.

Figure 1:
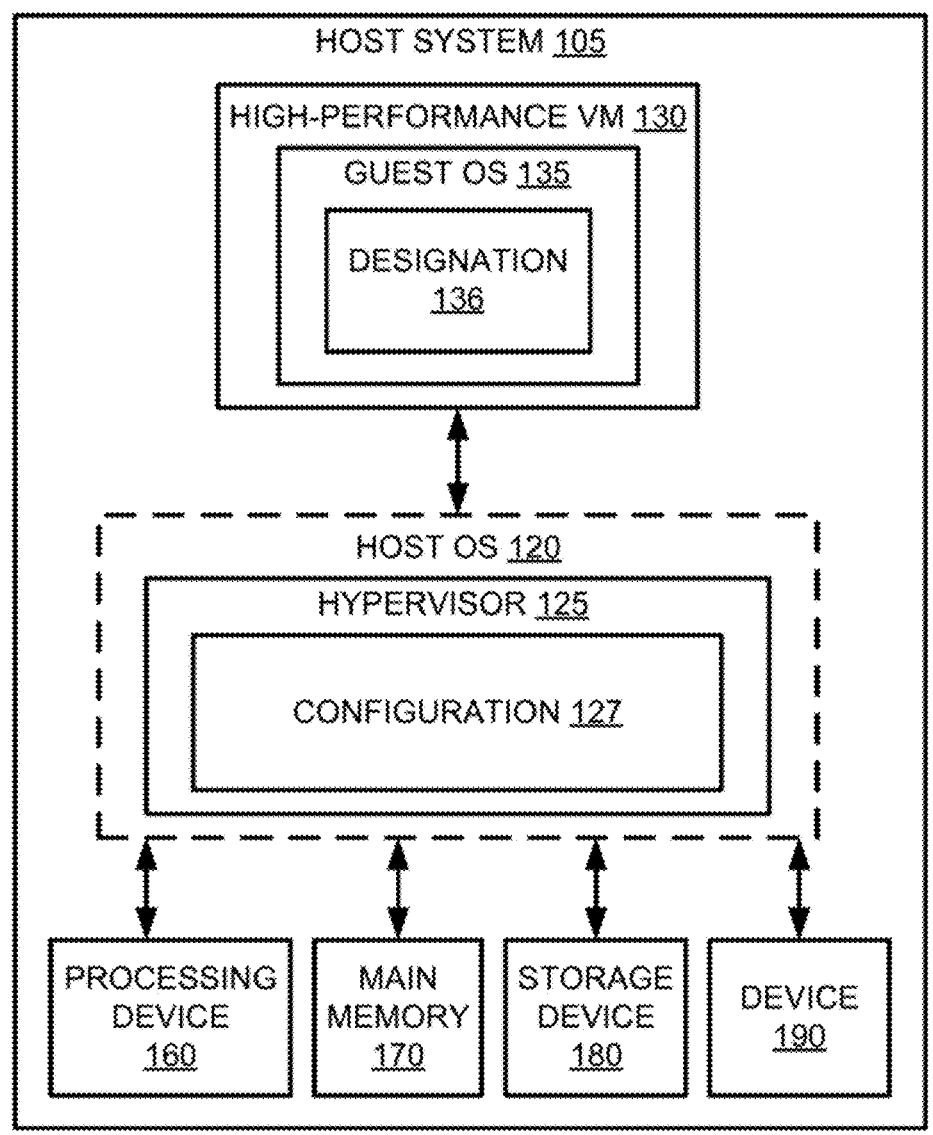
FIG. 1 depicts a first high-level component diagram of an example computer system architecture, in accordance with one or more aspects of the present disclosure.

FIG. 1 depicts a first high-level component diagram of an illustrative example of a computer system architecture 100, in accordance with one or more aspects of the present disclosure. One skilled in the art will appreciate that other computer system architectures 100 are possible, and that the implementation of a computer system utilizing examples of the invention are not necessarily limited to the specific architecture depicted by FIG. 1.

As shown in FIG. 1, computer system architecture 100 includes a host system 105. The host system 105 includes one or more processing devices 160 (e.g., central processing units, graphical processing units, etc.), main memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, main memory 170 may be non-uniform access (NUMA), such that memory access time depends on the memory location relative to processing device 160. It should be noted that although, for simplicity, a single processing device 160, main memory 170, storage device 180, and device 190 are depicted in FIG. 1, other embodiments of host system 105 may include a plurality of CPUs, memories, storage devices, and devices.

The host system 105 may be a server, a mainframe, a workstation, a personal computer (PC), a mobile phone, a palm-sized computing device, etc. Host system 105 may additionally include one or more virtual machine (VM), e.g., high-performance VM 130, and host operating system (OS) 120. It should be noted that like every other component of system 100, host OS 120 is optional (e.g., for hardware-based hypervisors). VM 130 is a software implementation of a machine that executes programs as though it was an actual physical machine. Host OS 120 and/or hypervisor 125 manages the hardware resources of the computer system and provides functions such as inter-process communication, scheduling, memory management, and so forth.

VM 130 may include a guest operating system (OS) 135 that handles the execution of applications (e.g., workloads) within the virtual machine. Guest OS 135 may control a device 190 through device driver 136. It should be noted that although, for simplicity, a single VM 130 is depicted in FIG. 1, host system 105 may host multiple VMs 130.

Host OS 120 may include a hypervisor 125, which provides a virtual operating platform for VMs 130 and manages their execution. Hypervisor 125 may include a hypervisor configuration 127. It should be noted that in some alternative implementations, hypervisor 125 may be external to host OS 120, rather than embedded within host OS 120, or may replace host OS 120.

Configuration 127 may be modified to balance performance and power usage of the host system, as described in detail below with respect to FIGS. 2-4. Configuration 127 can be an area of hypervisor memory, a shared memory space, a data structure saved in storage device 180, or the like. Configuration 127 may be a separate configuration file, or combined with other code associated with the hypervisor 125.

Figure 2:
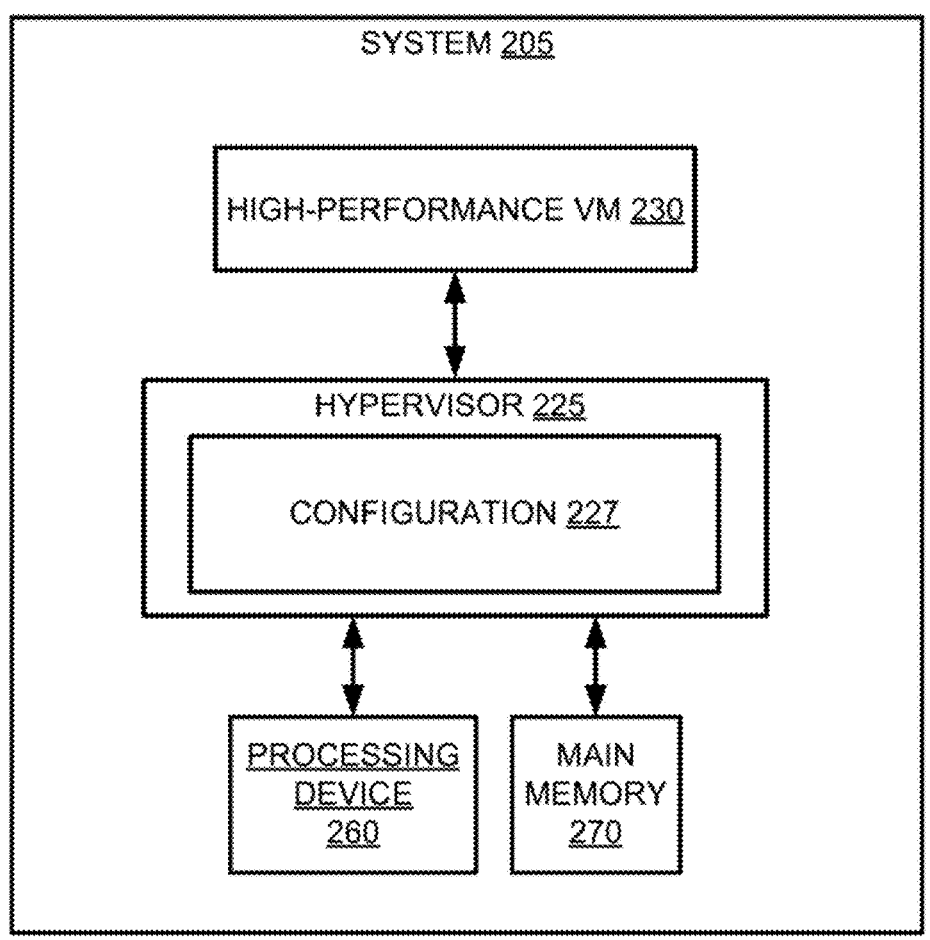
FIG. 2 depicts a second high-level component diagram of an example computer system architecture, in accordance with one or more aspects of the present disclosure.

FIG. 2 depicts a second high-level component diagram of an illustrative example of a computer system architecture 200, in accordance with one or more aspects of the present disclosure. One skilled in the art will appreciate that other computer system architectures 200 are possible, and that the implementation of a computer system utilizing examples of the invention are not necessarily limited to the specific architecture depicted by FIG. 2.

In one embodiment, system 200 represents a simplified view of system 100 or FIG. 1. As shown in FIG. 2, computer system architecture 200 includes a system 205. The system 105 includes one or more central processing units (CPU) 260 (e.g., processing devices) and main memory 270, which may include volatile memory devices (e.g., random access memory (RAM)), non-volatile memory devices (e.g., flash memory) and/or other types of memory devices. In certain implementations, main memory 270 may be non-uniform access (NUMA), such that memory access time depends on the memory location relative to processing device 260. It should be noted that although, for simplicity, a single processing device 260 and main memory 270 are depicted in FIG. 2, other embodiments of system 205 may include a plurality of CPUs, memories, storage devices, and devices.

The system 205 may be a server, a mainframe, a workstation, a personal computer (PC), a mobile phone, a palm-sized computing device, etc. System 205 may additionally include one or more virtual machines (VM), e.g., high-performance V M 230. VM 230 is a software implementation of a machine that executes programs as though it was an actual physical machine. Hypervisor 225 manages the hardware resources of the computer system and provides functions such as inter-process communication, scheduling, memory management, and so forth.

It should be noted that although, for simplicity, a single high-performance VM 230 is depicted in FIG. 2, system 205 may host multiple VMs including desktop VMs, server VMs, high-performance VMs, etc. Hypervisor 225 may provide a virtual operating platform for VMs 230 and manages their execution. Hypervisor 225 may include a hypervisor configuration 227.

Configuration 227 may be modified to balance performance and power usage of the host system, as described in detail below with respect to FIGS. 3-4, Configuration 227 can be an area of hypervisor memory, a shared memory space, a data structure saved in a storage device, or the like. Configuration 227 may be a separate configuration file, or combined with other code associated with the hypervisor 225.

Figure 3:
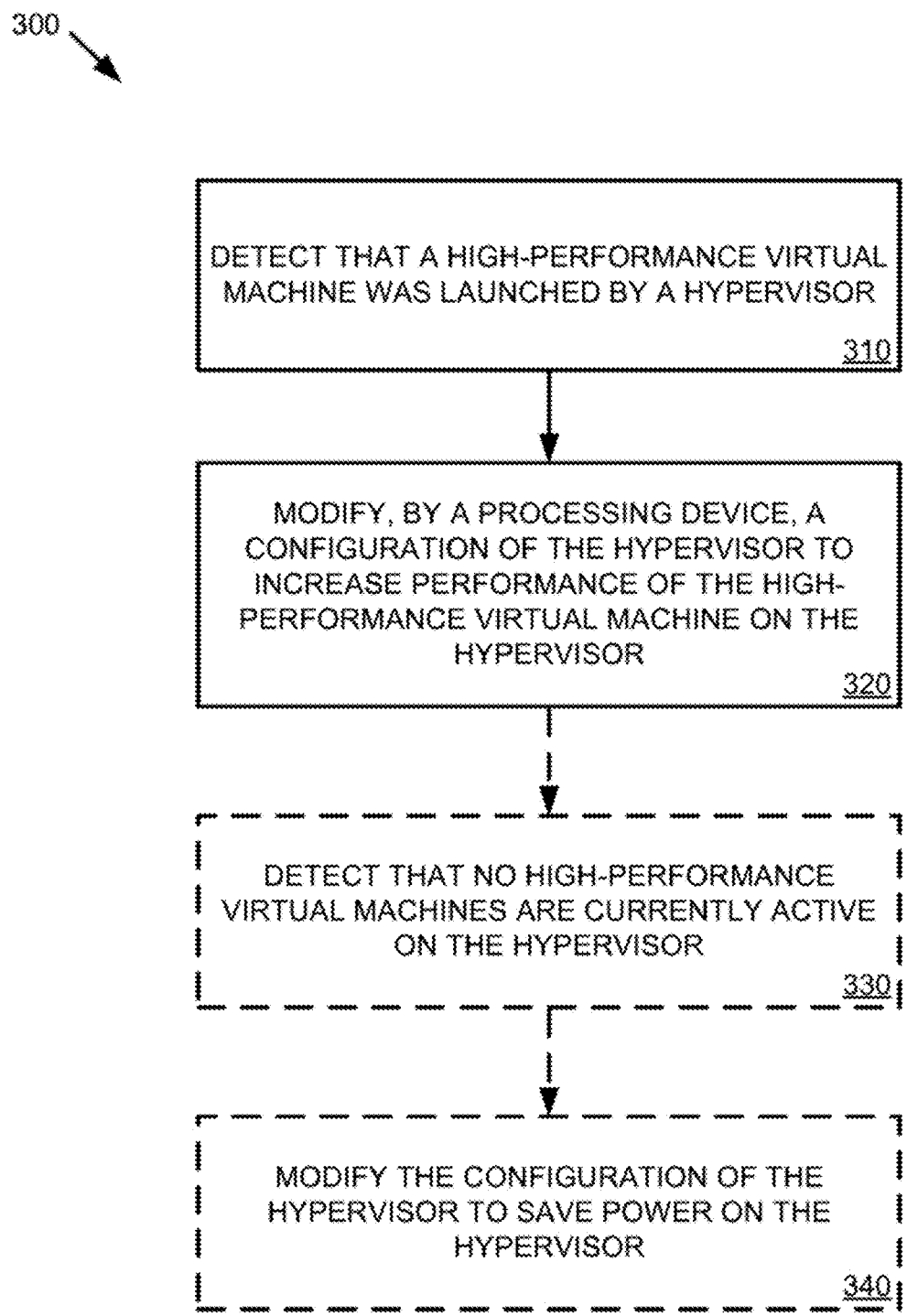
FIG. 3 is a flow diagram of a method of dynamic tuning of hypervisor for high-performance virtual machines, in accordance with some embodiments of the present disclosure.

FIG. 3 is a flow diagram of a method 300 of dynamic tuning of hypervisor for high-performance virtual machines, in accordance with some embodiments of the present disclosure. The method 300 may be performed by processing logic that comprises hardware (e.g., circuitry, dedicated logic, programmable logic, microcode, etc.), software (e.g., instructions run on a processing device to perform hardware simulation), or a combination thereof. In embodiments, aspects of method 300 may be performed by hypervisor 125/225 of FIG. 1/FIG. 2.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

Referring to FIG. 3, at block 310 the processing logic detects that a high-performance virtual machine was launched by a hypervisor. In one embodiment, processing logic may periodically check whether any high-performance virtual machines are running on the hypervisor. In another embodiment, the launching of a high-performance virtual machine enables a flag on the hypervisor.

In one embodiment, the high-performance virtual machine is self-designated as high-performing. In other words, the virtual machine itself indicates whether it is a high-performance virtual machine, or some other type of virtual machine (desktop, server, etc.). In another embodiment, processing logic may determine with the virtual machine is a high-performance virtual machine by analyzing the workloads run (or to be run) on the virtual machine, the resources required (either historical, currently, or in the future) by the virtual machine, etc. In one embodiment, desktop and server virtual machines are not high-performance virtual machines.

At block 320, in response to the detecting (at block 310), processing logic modifies, by a processing device, a configuration of the hypervisor to increase performance of the high-performance virtual machine on the hypervisor. In one embodiment, the hypervisor was previously configured in a power-saving state, in which the processing device on the host running the hypervisor is temporarily disabled during periods of low/no utilization. Processing logic, at block 320, may modify such configuration of the hypervisor to disable the entering of the low-power state in response to the determination at block 310.

In one embodiment, the configuration of the hypervisor is associated with a q-depth of a storage adapter of a host of the hypervisor. In another embodiment, the configuration of the hypervisor is associated with sleep characteristics of internal or external disks. In yet another embodiment, as described above, the configuration of the hypervisor is associated with a power-saving C-state of the hypervisor (e.g., of a CPU and/or GPU of the hypervisor). In such an embodiment, modifying the configuration of the hypervisor may include disabling the power-saving C-state of the hypervisor.

At block 330, processing logic detects that no high-performance virtual machines are currently active on the hypervisor. In one embodiment, this could include high-performance virtual machines that are instantiated to the host but currently inactive/dormant. At block 340, in response to the detecting at block 330, processing logic may modify the configuration of the hypervisor to save power on the hypervisor. In one embodiment, to modify the configuration of the hypervisor to save power, processing logic may enable a power-saving C-state.

In various embodiments, the modifying the configuration of the hypervisor, whether to increase performance or power efficiency, is performed without modifying any configuration of the high-performance virtual machine. In other words, the modifying of the configuration of the hypervisor is independent of any performance or power efficiency increasing modifications to the virtual machines (e.g., modifying memory, bandwidth, disk storage space, vCPU resources, etc.).

Figure 4:
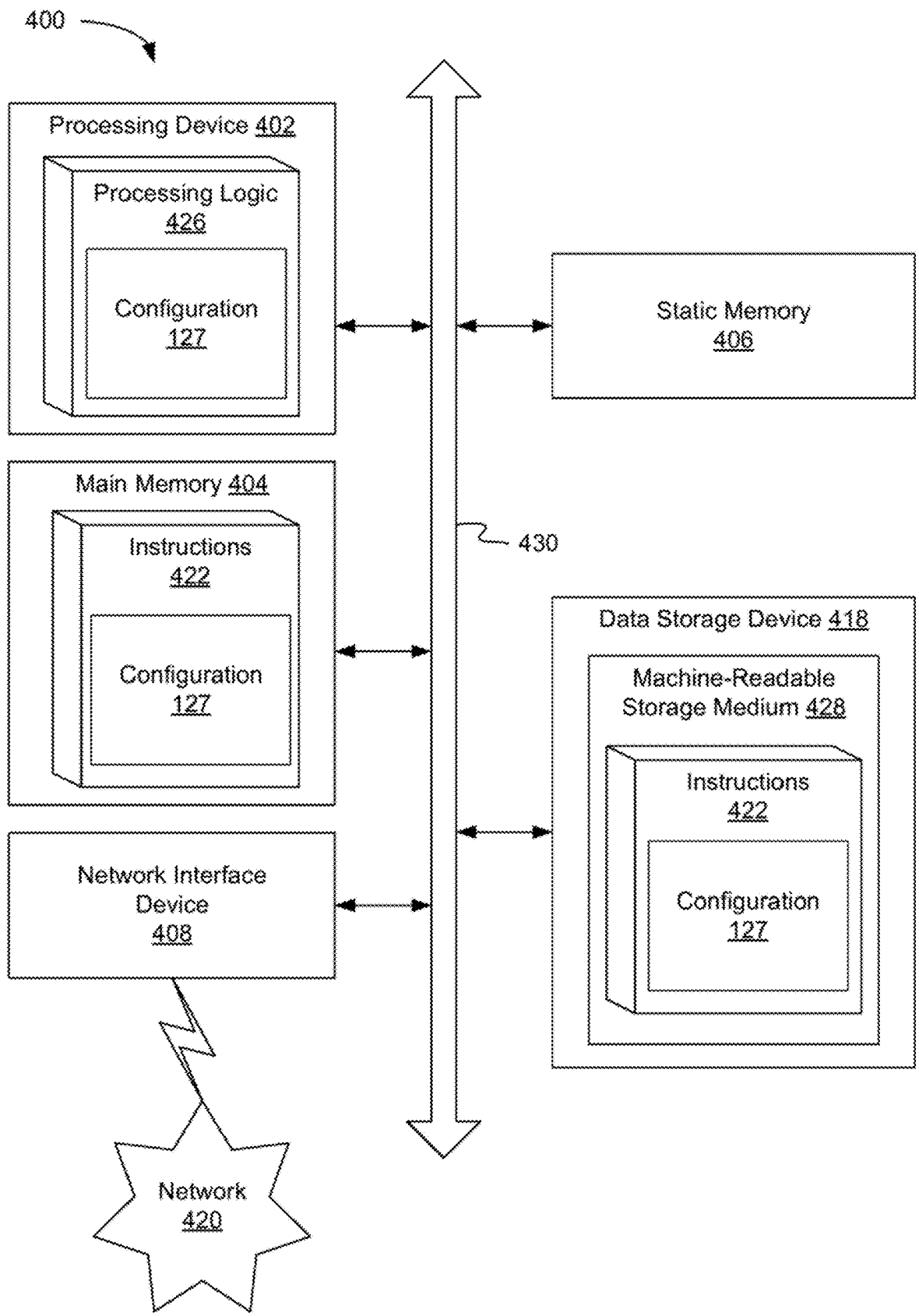
FIG. 4 depicts a block diagram of an illustrative computer system operating in accordance with examples of the invention.

FIG. 4 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 400 may be representative of a host system, such as host system 105/205 configured to perform the operations described herein.

The exemplary computer system 400 includes a processing device 402, a main memory 404 (e.g., read-only memory (ROM), flash memory, dynamic random access memory (DRAM), a static memory 406 (e.g., flash memory, static random access memory (SRAM), etc.), and a data storage device 418, which communicate with each other via a bus 430. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute/modify processing logic 426, which may be one example of configuration 127 of FIG. 1, for performing the operations and steps discussed herein.

The data storage device 418 may include a non-transitory computer-readable storage medium 428, on which is stored one or more set of instructions 422 (e.g., software) embodying any one or more of the methodologies of functions described herein, including instructions to cause the processing device 402 to modify configuration 127. The instructions 422 may also reside, completely or at least partially, within the main memory 404 or within the processing device 402 during execution thereof by the computer system 400; the main memory 404 and the processing device 402 also constituting machine-readable storage media. The instructions 422 may further be transmitted or received over a network 420 via the network interface device 408.

The non-transitory computer-readable storage medium 428 may also be used to store instructions to perform a method for multi-level task debugging, as described herein. While the non-transitory computer-readable storage medium 428 is shown in an exemplary embodiment to be a single medium, the term. "computer-readable storage medium" should be taken to include a single medium or multiple media (e.g., a centralized or distributed database, or associated caches and servers) that store the one or more sets of instructions. A computer-readable medium includes any mechanism for storing information in a form (e.g., software, processing application) readable by a machine (e.g., a computer). The computer-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally; some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "IX includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method, comprising:
   detecting by a hypervisor that a performance of a first virtual machine launched by the hypervisor is to be increased based on analyzing a workload that is being run on the first virtual machine and resources being used by the first virtual machine;
   in response to the detecting, modifying, by a processing device, a configuration of the hypervisor to increase performance of the first virtual machine on the hypervisor,
   wherein the configuration of the hypervisor that is modified is associated with a q-depth of a storage adapter of a host of the hypervisor;
   detecting that the first virtual machine is no longer active on the hypervisor; and
   in response to the detecting that the first virtual machine is no longer active on the hypervisor, modifying the configuration of the hypervisor that is associated with the q-depth of the storage adapter to save power on the hypervisor.

2. The method of claim 1, wherein the first virtual machine is self-designated as high-performing.

3. The method of claim 1, wherein the configuration of the hypervisor that is modified is further associated with a power-saving C-state of the hypervisor.

4. The method of claim 3, wherein modifying the configuration of the hypervisor further comprises disabling the power-saving C-state of the hypervisor.

5. The method of claim 1, wherein the modifying the configuration of the hypervisor is performed without modifying any configuration of the first virtual machine.

6. The method of claim 1, wherein the first virtual machine is not designated as a desktop virtual machine or a server virtual machine.

7. A system, comprising:
   a memory; and
   a processing device, operatively coupled to the memory, to:
   detect by a hypervisor that a performance of a first virtual machine launched by the hypervisor is to be increased based on an analysis of a workload that is being run on the first virtual machine and resources being used by the first virtual machine;
   in response to the detecting, modify a configuration of the hypervisor to increase performance of the first virtual machine on the hypervisor,
   wherein the configuration of the hypervisor that is modified is associated with a q-depth of a storage adapter of a host of the hypervisor;
   detect that the first virtual machine is no longer active on the hypervisor; and
   in response to the detecting that the first virtual machine is no longer active on the hypervisor, modify the configuration of the hypervisor that is associated with the q-depth of the storage adapter to save power on the hypervisor.

8. The system of claim 7, wherein the first virtual machine is self-designated as high-performing.

9. The system of claim 7, wherein the configuration of the hypervisor that is modified is further associated with a power-saving C-state of the hypervisor.

10. The system of claim 9, wherein to modify the configuration of the hypervisor, the processing device is to further disable the power-saving C-state of the hypervisor.

11. The system of claim 7, wherein the modifying the configuration of the hypervisor is performed without modifying any configuration of the first virtual machine.

12. The system of claim 7, wherein the first virtual machine is not designated as a desktop virtual machine or a server virtual machine.

13. A non-transitory computer-readable storage medium including instructions that, when executed by a processing device of a source host system, cause the processing device to:
- detect by a hypervisor that a performance of a first virtual machine launched by the hypervisor is to be increased based on an analysis of a workload that is being run on the first virtual machine and resources being used by the first virtual machine;
- in response to the detecting, modify, by the processing device, a configuration of the hypervisor to increase performance of the first virtual machine on the hypervisor,
- wherein the configuration of the hypervisor that is modified is associated with a q-depth of a storage adapter of a host of the hypervisor;
- detect that the first virtual machine is no longer active on the hypervisor; and
- in response to the detecting that the first virtual machine is no longer active on the hypervisor, modify the configuration of the hypervisor that is associated with the q-depth of the storage adapter to save power on the hypervisor.

14. The non-transitory computer-readable storage medium of claim 13, wherein the first virtual machine is self-designated as high-performing.

15. The non-transitory computer-readable storage medium of claim 13, wherein the configuration of the hypervisor that is modified is further associated with a power-saving C-state of the hypervisor.

16. The non-transitory computer-readable storage medium of claim 15, wherein to modify the configuration of the hypervisor, the processing device is to further disable the power-saving C-state of the hypervisor.

* * * * *